Figure 1:
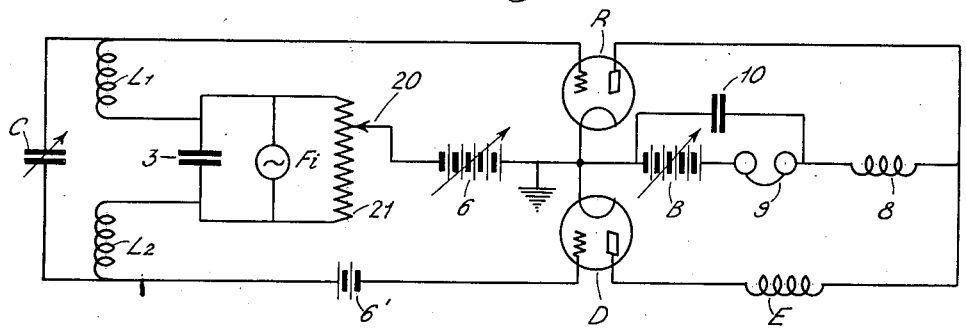

Dec. 11, 1934.   W. VAN B. ROBERTS   1,983,812
SUPERREGENERATIVE CIRCUIT
Filed Jan. 23, 1932

INVENTOR
WALTER VAN B. ROBERTS
BY
ATTORNEY

Patented Dec. 11, 1934

1,983,812

UNITED STATES PATENT OFFICE 1,983,812

SUPERREGENERATIVE CIRCUIT

Walter van B. Roberts, Princeton, N. J., assignor to Radio Corporation of America, a corporation of Delaware Application January 23, 1932, Serial No. 588,316

5 Claims. (Cl. 250—20)

My present invention relates to regenerative systems, and more particularly to an improved type of super-regenerative receiving circuit.

In my copending application Serial No. 351,411, filed March 30, 1929, there has been disclosed a method of securing great amplification in a super-regenerative system without building up sustained oscillations. Briefly, the method disclosed in the aforementioned application comprises periodically reversing the phase of the feed-back in the system for rapidly quenching radio frequency oscillations during the damping period. The particular embodiment disclosed in the said application consists of a pair of space discharge devices, one of the devices intermittently functioning as an oscillation generator, the other tube intermittently, and alternately with the first tube, acting to quench oscillations prior to the instant when oscillations built up by the oscillation generator would otherwise attain an undesirable amplitude.

Additionally, in my application Serial No. 543,925 filed June 12, 1931 now Patent No. 1,948,315, granted February 20, 1934, there have been disclosed various embodiments for producing super-regeneration in a receiving system including a pair of oppositely connected space discharge devices, the basic method employed in each of these embodiments consisting in applying simultaneously both signal energy and a low frequency interrupting voltage in a differential manner to the devices, the common output circuit of the devices being coupled to the common input circuit of the said devices. It was pointed out in the second of said copending applications that the embodiments disclosed therein could be considered as balanced modulator circuits, wherein a signal collecting circuit, and a relatively low frequency modulating voltage source were provided, and additional means for feeding back to the signal circuit the side bands at radio frequency produced by modulation of signal voltages.

More particularly, there was disclosed a super-regenerative arrangement wherein a source of interrupting frequency was coupled directly across the input of a pair of oppositely connected space discharge devices, a common feed-back reactance in the common output circuit of the devices being utilized to couple the said common output circuit to reactances in the common input circuit of the said devices. While various advantages were stated as being secured by means of this last mentioned super-regenerative embodiment, further experimentation and development on this type of super-regenerative circuit have resulted in additional advantages.

Therefore, it may be stated that it is one of the main objects of my present invention to provide a method of, and means for producing super-regeneration in a receiving system including a pair of oppositely connected space discharge devices, the method consisting in applying signal energy in a differential manner to the common input circuit of the devices, and a relatively low frequency voltage to one only of the devices, which method permits the exponential building up of signal energy by means of feed back from the common output circuit to the input circuit of the devices.

Another important object of the present invention is to provide a system including a means for collecting radio frequency signal energy, a modulator circuit partially balanced as to radio frequency output, a relatively low frequency modulating voltage, means for feeding back to the signal collecting means the side bands at radio frequency produced by modulation. Another description of this object is to provide means whereby the effective resistance of the radio frequency input circuit of an electronic device will vary in such a manner that the negative resistance of the said input circuit is practically constant over a half period of a relatively low frequency modulating voltage, while its average value over the other half period is large and positive.

Still other objects of the present invention are to improve generally the simplicity and efficiency of super-regenerative receiving circuits, and to particularly provide a receiving system of the super-regenerative type which is reliable in operation.

The novel features which I believe to be characteristic of my invention are set forth in particularity in the appended claims, the invention itself, however, as to both its organization and method of operation will best be understood by reference to the following description taken in connection with the drawing in which I have indicated diagrammatically several circuit arrangements whereby my invention may be carried into effect.

Figure 2:
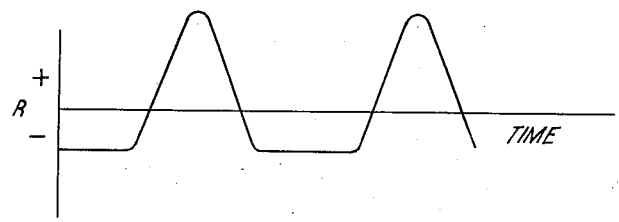
Figure 3:
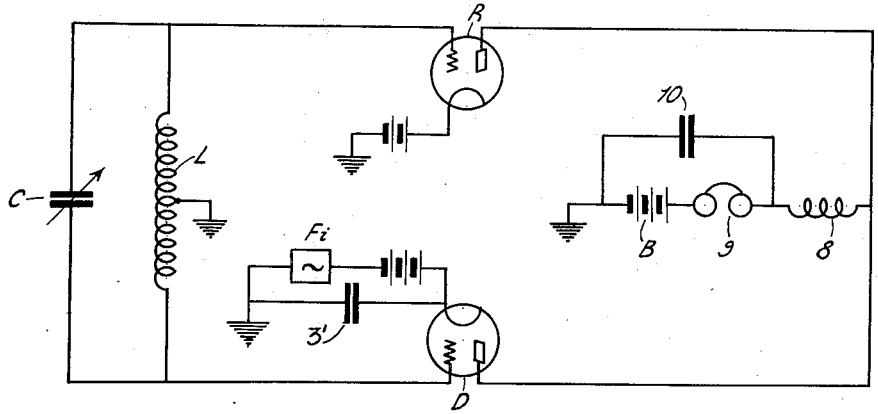

In the drawing,

Fig. 1 diagrammatically shows a circuit embodying the present invention,

Fig. 2 graphically illustrates the operation of the invention,

Fig. 3 diagrammatically shows another form of the invention.

Referring now to the accompanying drawing, Fig. 1 shows a source of low frequency interrupting current $F_1$, the source being differentially coupled to the common input circuit of a pair of oppositely connected space discharge devices R and D. These devices are specifically shown as electron discharge tubes of the triode type, but it is to be clearly understood that they may be any other type of electron discharge tube, such as the tetrode, pentode and the like. The details of the source of interrupting current are not shown, since this source may comprise any type of audio frequency oscillator well known to those skilled in the art, the interrupting frequency preferably having a magnitude of the order of 5000 cycles, although there are no definite lower or upper limits except that it should be less than signal frequency. It is to be understood that the source $F_1$ should preferably include a means for adjusting the strength of the voltage applied across the potentiometric resistor 21.

The signal collecting circuit comprises a split inductance coil including the portions $L_1$, $L_2$, a variable condenser C being connected across the said inductance portions. The variable condenser is preferably of the "Remler" type, and is well known to those skilled in the art as being electrically symmetrical. The grid of each tube is connected to a terminal of each inductance portion, the remaining terminal of each portion being connected to a terminal of a fixed capacity 3. The latter is connected in series between the portions $L_1$, $L_2$.

The fixed capacity 3 is given a value such that its reactance at signal frequencies is small compared with that of C, and is connected in shunt with the resistor 21, the latter being connected across the source $F_1$. Bias is provided for the grids of the tubes by means of an adjustable current source 6, the negative terminal of which source is adjustably connected, as at 20, to the resistor 21, while the positive terminal of said source is connected to the grounded, common, cathode lead of the tubes R, D. In practice it has been found that with tubes having an amplification constant of about 9, and 90 volts on the plates, the optimum bias for the grids of the tubes lies between 6 and 15 volts, it being pointed out that the larger the bias the stronger should be the audio frequency input.

Positive potential is applied to the anodes of the tubes from a source B, the latter having its negative terminal connected to the common cathode lead of the tubes. The positive terminal of the source B is connected in series with a feed-back inductance coil 8 through a signal utilization means 9, the latter comprising, for example, a pair of head-phones. A fixed radio frequency by-pass condenser 10, preferably having a magnitude of the order of 0.006 micro-farad, is connected in parallel with the source B and the head-phones 9.

It has been found that the circuit shown in Fig. 1 operates efficiently with well matched tubes. In practice an antenna is not needed, a three inch tuning coil at $L_1$, $L_2$ having been found to supply sufficient signal pick-up. For long wave broadcast stations, it is merely necessary to utilize more capacity across the resistor 21, and a correspondingly lower interruption frequency at the source $F_1$. Furthermore, it is to be clearly understood that the signal circuit C, $L_1$, $L_2$ may be coupled to the output of a neutralized or screen grid stage of amplification disposed between an antenna and the common input circuit of the tubes R, D, or a source of high intermediate frequency of a super-heterodyne receiver, might well be disposed prior to the signal circuit of the two tubes. In other words, it is to be clearly understood that the circuit shown in Fig. 1 lends itself readily to amplification of radio frequencies, regardless of the source of such radio frequencies.

In my aforementioned copending application, Serial No. 543,925 both the signal energy and low frequency interrupting energy are differentially, and simultaneously applied to the oppositely connected tubes 1 and 2, and the common output of the two tubes is coupled to the signal input circuit.

In the case of the present invention, however, only the signal is applied to both of the oppositely connected tubes, the low frequency interrupting voltage being applied only to tube D. As a result of this the action of tube R is uniform and unaffected by the interruption voltage, and is equivalent to the insertion of a constant amount of negative resistance in the circuit C, $L_1$, $L_2$. The application of the interrupting voltage to tube D renders this tube entirely inoperative during alternate half periods of the interrupting voltage and highly operative during the other half periods.

The effect of tube D is, therefore, equivalent to the insertion of large amounts of positive resistance into the tuned circuit C, $L_1$, $L_2$ during every other half period of the interrupting voltage by not having any effect upon the resistance of the tuned circuit during the remaining half periods of the interrupting voltage. The tube D is, of course, rendered inoperative when the interrupting voltage adds to the bias battery voltage 6, 6' to produce a total negative potential on the grid of tube D with respect to its cathode so great as to completely shut off the flow of plate current in this tube. In order to increase the amount of positive resistance thrown into the tuned circuit C, $L_1$, $L_2$ during the quenching intervals the tube D may be chosen to have a greater amplifying power than tube R, or the feed-back from the plate circuit of tube D may be made greater than that of tube R by the insertion of the extra feed-back coil E of Figure 1, or by any other means for coupling tube D more strongly than tube R to the tuned circuit.

It is, of course, an equivalent mode of control to vary the potential of the cathode of tube D relative to the grid potential as shown in Fig. 3. If this is done the radio frequency by-pass condenser 3 of Figure 1 is not required, but a radio frequency by-pass condenser 3' between cathode and ground of tube D is required. Furthermore, it is also possible to inject the interrupting voltage into the plate circuit of tube D, but this procedure involves the necessity for supplying considerably greater interrupting voltages and much greater power from the source of interruption frequency voltage.

The graphic representation in Fig. 2 is obtained by plotting effective resistance R of the tuned signal circuit C, $L_1$, $L_2$ as ordinates against time as abscissæ. It will be observed from Fig. 2 that the negative resistance is practically constant over a half period of the interrupting frequency $F_1$. From the curve of Fig. 2 it will also be seen that during the reverse feed-back action there occurs an unbalance in favor of the tube D. There is also thus obtained an exponential "building up" of signals, since it is well known that in the presence of constant resistance (either negative or positive) the oscillations in a tuned circuit will have their amplitude vary with time in an exponential fashion. It is also well known that for small periods of time, exponential variation is substantially linear in nature, and thus the average amount of oscillation current in the tuned circuit is substantially proportional to the value of amplitude of the signal wave at all times.

The main object and novel feature of this invention is that during the building up period the regenerative action or negative resistance remains constant because the damping action of the other tube is entirely absent while during the quenching period the damping action or positive resistance effect may be made as large as necessary. The invention is thus broad in nature and is not limited to the particular circuits shown as there are many modifications of these circuits possible.

What I claim is:

1. Apparatus for amplifying varying electric currents comprising a space discharge device having a tuned input circuit and an output circuit said input and output circuits being coupled so as to produce regeneration, a second space discharge device having an input circuit and an output circuit said last named input and output circuits being coupled so as to produce degeneration, said two input circuits including a common portion and said two output circuits including a common portion, a source of interrupting frequency energy effectively in circuit with the second named space discharge device only for rendering said space discharge device alternately effective and ineffective, said second named space discharge device being adapted to introduce a positive resistance in said tuned circuit during its period of effectiveness to thereby control the effect of the regenerative action of the first named device.

2. Apparatus for amplifying varying electric currents comprising, a space discharge device having a tunable input circuit adapted to be tuned to the frequency of desired signals, and an output circuit, said two circuits being coupled in a sense to impress a negative resistance characteristic effect upon the tuned circuit, a second space discharge device having an input circuit a portion of which is common with the input circuit of the first mentioned space discharge device and an output circuit a portion of which is common with the output circuit of the first mentioned discharge device, the input and output circuits of the second named space discharge device being coupled so as to produce positive resistance characteristic effects upon the tuned circuit, a source of interrupting frequency energy effectively in circuit with the second named space discharge device only for rendering the second named space discharge device alternately effective and ineffective to introduce through said positive resistance characteristic effects a positive resistance in the tuned circuit during the period of effectiveness of said second named space discharge device to thereby control the effect of the constant negative resistance characteristic effect of the first named space discharge device.

3. Apparatus for amplifying varying electric currents comprising, a space discharge device having a tunable input circuit adapted to be tuned to the frequency of desired signals, and an output circuit, said two circuits being coupled in a sense to give the tuned circuit a negative resistance characteristic, a second space discharge device having an input circuit of which a portion is common to the first named input circuit, and an output circuit of which a portion is common with the first named output circuit, the input and output circuits of the second named space discharge device being coupled so as to introduce a positive resistance characteristic effect into the tuned circuit, a source of variable biasing potential in the input circuit of the second named space discharge device only for periodically and alternately rendering the second named space discharge device effective and ineffective and to thereby introduce the positive resistance characteristic into the tuned circuit only during the period of effectiveness of the second named device, said periodic positive resistance characteristic acting to overcome the effect of the negative resistance characteristic of the first named space discharge device whereby currents proportional in intensity to a predetermined characteristic of the signalling energy are alternately and periodically built up and damped in said tuned circuit in consonance with changes in the variable biasing source.

4. Apparatus for amplifying varying electric currents comprising, a space discharge device having a tunable input circuit adapted to have the electric currents to be amplified impressed thereon and an output circuit, said two circuits being coupled in a sense to transfer to the tuned circuit a negative resistance effect, a second space discharge device having an input circuit of which a portion thereof is common to the first named input circuit, and an output circuit, the input and output circuits of the second named space discharge device being coupled so as to introduce a positive resistance characteristic effect into the tuned circuit, the degree of which is controlled by said second named space discharge device, a source of super-audible frequency biasing potential in the input circuit of the second named space discharge device only, for periodically and alternately rendering the second named space discharge device ineffective to introduce the positive resistance characteristic into the tuned circuit only during the period of effectiveness of the second named device, said periodic positive resistance characteristic acting to overcome the effect of the constant negative resistance characteristic of the first named space discharge device upon said tuned circuit whereby currents proportional in intensity to the varying incoming energy are alternately and periodically built up and damped in said tuned circuit in consonance with said supersonic frequency.

5. In a super-regenerative receiver, a negative resistance circuit including a space discharge device, a positive resistance circuit including a space discharge device, a tunable signal input circuit common to both of said first named circuits, a load common to both said first named circuits and means acting only upon the positive resistance circuit for rendering said positive resistance circuit alternately and periodically operative and inoperative to introduce a positive resistance effect into one of said common circuits whereby the effect of the negative resistance circuit upon the said common circuit is periodically damped.

WALTER van B. ROBERTS.